No. 764,991. PATENTED JULY 12, 1904.
A. DIAT DIT DIAZ.
METALLIFIED GLASS.
APPLICATION FILED NOV. 11, 1903.
NO MODEL.

Witnesses
C. Heymann
A. Hall

Inventor:
Antoine Diat dit Diaz
per
B. Singer
Attorney

No. 764,991. Patented July 12, 1904.

UNITED STATES PATENT OFFICE.

ANTOINE DIAT DIT DIAZ, OF BRUSSELS, BELGIUM.

METALLIFIED GLASS.

SPECIFICATION forming part of Letters Patent No. 764,991, dated July 12, 1904.

Application filed November 11, 1903. Serial No. 180,703. (No model.)

*To all whom it may concern:*

Be it known that I, ANTOINE DIAT DIT DIAZ, a subject of the King of Belgium, and a resident of Brussels, Belgium, have invented a new Metallified Glass, of which the following is a specification.

This invention relates to a new metallified glass composed, like all metallified glass made hitherto, of sheets of glass surrounding a metal webbing; but its distinguishing feature from all similar products is that the armature or webbing continues outside the sheet of glass by a metal frame of a very small thickness (about one-half millimeter) entering slightly into the edge of the sheet of glass and attached directly to the metal webbing. This frame, the width whereof varies according to the different thicknesses of glass or to its use, is attached to the webbing when the same is being woven by passing each of the wires in holes made in the frame or by attaching the webbing to the frame at every ten centimeters by means of wires. Glass is then run upon the webbing.

Figure 1:
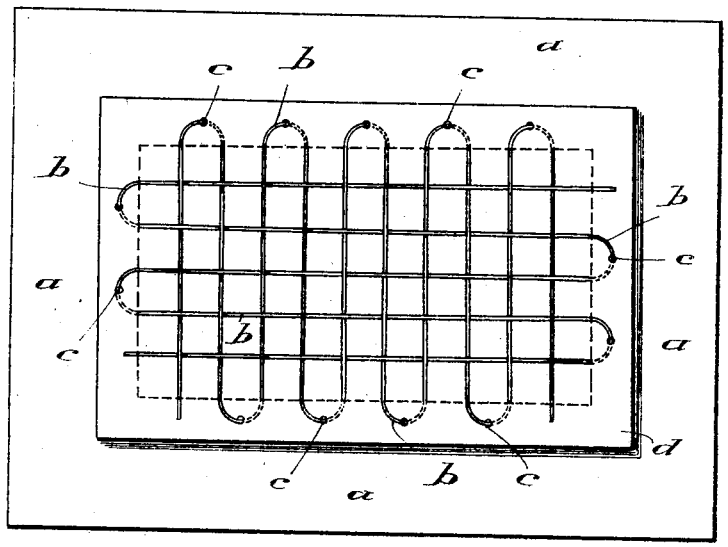
Figure 2:
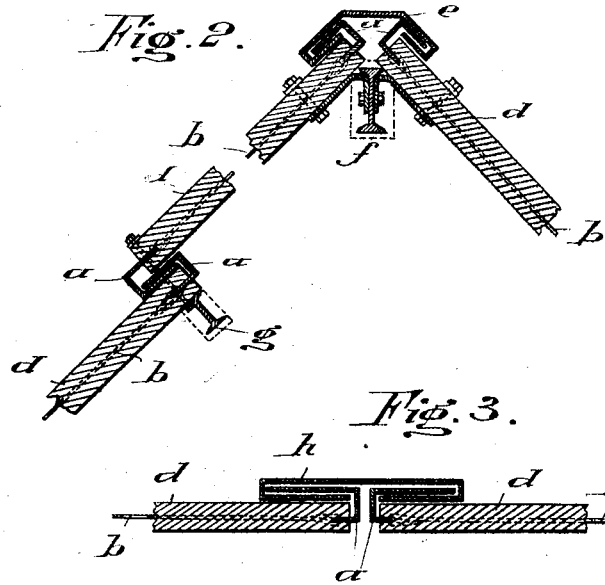
Figure 3:
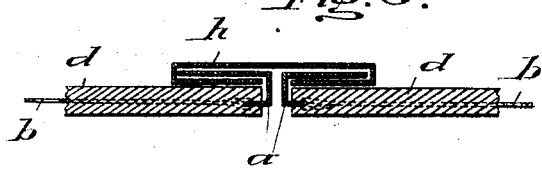

In the annexed drawings, given by way of example, Figure 1 is a plan view of a sheet of metallified glass furnished with the aforenamed framing. Fig. 2 shows a sectional view of my improved glass, shown for convenience as attached to a roof. Fig. 3 is a sectional view showing a modified form of rim as used in making horizontal joints.

As illustrated in the drawings, a metal frame $a$, having perforated inner edges, is provided with a webbing, the wires $b$ of which are passed through the perforations $c$ in the frame. The glass $d$ is then formed to completely surround the webbing, as well as a portion of the inner edges of the frame, so that the latter will be integral with the sheet. These frames may be formed of any convenient cross-section whereby the glass sheets may be secured in different positions. For instance, as shown in Fig. 2, the frames are formed so that when the lower sheets are secured to the beams $g$ they may connect with the upper sheets, which are attached to the upper beam $f$, and the two upper sheets are connected by a ridge-piece $e$. In the somewhat modified form shown in Fig. 3 the frame-pieces are formed to connect with a joint member $h$. By means of this improved form of metallified glass the sheets may be readily connected in various desired manners without the use of putty, asbestos, or plastic substance and without the use of window-irons.

Having now fully described my invention, what I claim, and desire to secure by Letters Patent, is—

1. The combination in sheets of metallified glass, with the usual metal webbing surrounded by glass, of a metal frame partially embedded in the glass and projecting beyond the sheet, said webbing being connected with said frame, substantially as described.

2. The combination with perforated metallic edge strips, of wire webbing or the like woven through the perforations in said strips, and glass incasing said webbing and the inner portions of said edge strips, the latter projecting from said glass for any desired distance.

ANTOINE DIAT DIT DIAZ.

Witnesses:
E. J. BELLÉAUME,
GREGORY PHELAN.